United States Patent

Matsuo et al.

[11] Patent Number: 5,714,071
[45] Date of Patent: Feb. 3, 1998

[54] METHOD FOR EXTRACTING ORGANIC SUBSTANCE, SOLVENT FOR USE IN SAID METHOD, AND METHOD FOR MEASURING CONTENT OF ORGANIC SUBSTANCE

[75] Inventors: Kazuhiro Matsuo, Katano; Juichi Sasada, Kyoto, both of Japan

[73] Assignee: Matsushita Electronics Corporation, Osaka, Japan

[21] Appl. No.: 753,688

[22] Filed: Nov. 27, 1996

Related U.S. Application Data

[63] Continuation of Ser. No. 393,834, Feb. 24, 1995, abandoned.

[30] Foreign Application Priority Data

Feb. 24, 1994 [JP] Japan ................. 6-026515
Mar. 1, 1994 [JP] Japan ................. 6-031315

[51] Int. Cl.$^6$ ........................ B01D 11/00
[52] U.S. Cl. ...................... 210/634; 210/511
[58] Field of Search ................. 210/634, 739, 210/806, 259, 511

[56] References Cited

U.S. PATENT DOCUMENTS

| | | | |
|---|---|---|---|
| 4,060,604 | 11/1977 | Kanojia | 424/195 |
| 4,877,530 | 10/1989 | Moses | 210/511 |
| 5,035,828 | 7/1991 | Tamura et al. | 252/170 |
| 5,420,304 | 5/1995 | Verser et al. | 549/274 |

FOREIGN PATENT DOCUMENTS

| | | |
|---|---|---|
| 0081231 | 6/1983 | European Pat. Off. . |
| 2652380 | 5/1977 | Germany . |
| 2730378 | 1/1978 | Germany . |

*Primary Examiner*—Ernest G. Therkorn
*Attorney, Agent, or Firm*—Wenderoth Lind & Ponack

[57] ABSTRACT

A method for extracting an organic substance from a material by extracting the organic substance with a mixed solvent which contains at least one polar solvent and at least one nonpolar solvent, by which a wide variety of organic substances can be extracted without using a halohydrocarbon at a relatively low temperature.

17 Claims, 5 Drawing Sheets

METHOD FOR EXTRACTING ORGANIC SUBSTANCE, SOLVENT FOR USE IN SAID METHOD, AND METHOD FOR MEASURING CONTENT OF ORGANIC SUBSTANCE

This application is a continuation of now abandoned Ser. No. 08/393,834 filed Feb. 24, 1995.

BACKGROUND OF THE INVENTION

1. Field of the Invention

The present invention relates to a method for extracting an organic substance, a solvent for use in said method and a method for measuring a content of an organic substance in various materials.

In particular, the present invention relates to a method for extracting an organic substance such as a press oil which is used in a step of pressing a shadow mask of a color cathode ray tube, a small amount of oil contained in waste water from factories, a lubricant contained in a polyethylene bag, a silicone oil used in the production of semiconductor devices, a mixed solvent which is used in such extracting method, and a method for measuring a content of such organic substance to determine a defatting and cleaning effect of a press oil which is used in a step for pressing a shadow mask of a color cathode ray tube or a small amount of oil contained in waste water from factories, to analyze a lubricant contained in a polyethylene bag, or to measure a deposited amount of a silicone oil used in the production of semiconductor devices.

2. Description of the Related Art

Various solvents are used for extracting organic substances or cleaning a product. Among them, a halohydrocarbon solvent such as trichloroethane or carbon tetrachloride is used in a wide variety of fields since it has many advantageous properties such as low toxicity, less flammability and a quick drying property.

However, since trichloroethane and carbon tetrachloride have large ozone destruction coefficients, they will have to be abolished completely by 2000 according to the Montreal Protocol of 1987. Accordingly, their use amounts should be quickly decreased in view of the protection of the environment.

In the extraction of an organic substance, an organic solvent should be selected according to its dissolving ability. Since a large number of organic solvents are known, it is often necessary to select and use a suitable polar or nonpolar solvent according to an organic substance to be extracted. When two or more organic substances are contained in a product, it is difficult to extract or remove them from the product at the same time.

In these days, in quantitative analysis of an organic substance, an intensity of a specific absorption due to a C—H bond around 2920 $cm^{-1}$ in an infrared region is measured since the organic substance such as an oil always has the C—H bond.

An example of a conventional method for analyzing an oil will be explained.

FIG. 1 shows a cell which is conventionally used in an infrared spectroscopy. The cell 61 comprises a cylindrical glass body 63 having an inlet 62 and window plates 64, 65 which air-tightly seal respective openings of the body 63. An opening of the inlet 62 is air-tightly sealed with a glass cap 62.

A solvent such as carbon tetrachloride in which an oil is dissolved is poured in the cell 61 through the inlet 62, and the opening of the inlet 62 is closed with the cap 66. Then, an infrared ray is passed through the cell 61 from one window plate to the other, whereby an intensity of the specific absorption of the C—H bond of the oil is measured.

SUMMARY OF THE INVENTION

An object of the present invention is to provide a method for extracting at least one organic substance from a material without using any halohydrocarbon.

Another object of the present invention is to provide a method for extracting an organic substance which can be dissolved only in a solvent having a high boiling point, at a relatively low temperature.

A further object of the present invention is to provide a mixed solvent comprising no halohydrocarbon, which can extract an organic substance from a material.

A yet further object of the present invention is to provide a method for measuring a content of an organic substance in a material.

According to a first aspect of the present invention, there is provided a method for extracting at least one organic substance from a material comprising extracting said at least one organic substance with a mixed solvent which comprises at least one polar solvent and at least one nonpolar solvent.

According to a second aspect of the present invention, there is provided a method for extracting at least one organic substance from a material comprising steps of dissolving said at least one organic substance in one of a polar solvent and a nonpolar solvent to form a solution and adding the other one of said polar solvent and said nonpolar solvent to said solution in an azeotropic ratio.

According to a third aspect of the present invention, there is provided a method for extracting at least one organic substance from a material comprising steps of:

dissolving said organic substance in a first solvent which is one of a polar solvent and a nonpolar solvent to form a solution, adding an excess amount of a second solvent which can form an azeotropic mixture with said first solvent and is the other one of said polar solvent and said nonpolar solvent to said solution, removing said first solvent, leaving an excess portion of said second solvent, adding an excess amount of a third solvent which can form an azeotropic mixture with said second solvent to said remaining second solvent, removing said second solvent, leaving an excess portion of said third solvent, and repeating the addition of a subsequent solvent to a previous remaining solvent and removal of the previous solvent to leave the subsequent solvent having a lower boiling point.

According to a fourth aspect of the present invention, there is provided a mixed solvent comprising a polar solvent and a nonpolar solvent and having both a dissolving ability as said polar solvent and a dissolving ability as said nonpolar solvent.

According to a fifth aspect of the present invention, there is provided a method for measuring a content of an organic substance in a material comprising steps of:

dissolving said organic substance in a mixed solvent which comprises at least one polar solvent and at least one nonpolar solvent and has an azeotropic point lower than any boiling points of said polar and nonpolar solvents, removing said mixed solvent to selectively collect said organic substance and measuring an intensity of a specific absorption of a C—H bond around 2920 cm$^{-1}$ in an infrared spectroscopy.

DETAILED DESCRIPTION OF THE INVENTION

In the present invention, an organic substance is extracted with a mixed solvent which comprises at least one polar solvent and at least one nonpolar solvent. Preferably, the mixed solvent has both a dissolving ability as the polar solvent and a dissolving ability as the nonpolar solvent.

In a preferred embodiment, the mixed solvent has a lowest azeotropic point, and an organic substance having a boiling point higher than the lowest azeotropic point is extracted with the mixed solvent.

Preferred examples of the polar solvent are ketones having 3 to 10 carbon atoms such as acetone, methyl ethyl ketone, 2-pentanone, 3-pentanone, 2-hexanone, methyl isobutyl ketone, 2-heptanone, 4-heptanone, diisobutyl ketone and the like. They may be used independently or in combination of two or more of them. Among them, acetone is preferred. Other polar solvents may be used in place of or in addition to the ketone.

Preferred examples of the nonpolar solvent are hydrocarbons having 4 to 10 carbon atoms such as pentane, 2-methylbutane, 2-methylpentane, 2,2-bimethylbutane, 2,3-dimethylbutane, heptane, octane, 2,2,3-trimethylpentane, and the like. They may be used independently or in combination of two or more of them. Among them, hexane is preferred. Other nonpolar solvents may be used in place of or in addition to the hydrocarbon.

Preferred examples of the mixed solvent are a mixture of acetone and hexane.

Preferably, the polar solvent such as acetone is used in an amount with which the mixed solvent has the lowest azeotropic point or larger. For example, when acetone and hexane are used as a polar solvent and a nonpolar solvent, respectively, an amount of acetone is 56% by weight or larger, while an amount of hexane is 44% by weight or less, more preferably the amount of acetone is from 56 to 66% by weight, while the amount of hexane is from 44 to 34% by weight.

According to the extraction method of the present invention, it is possible to extract plural organic substances from a material.

Figure 1:
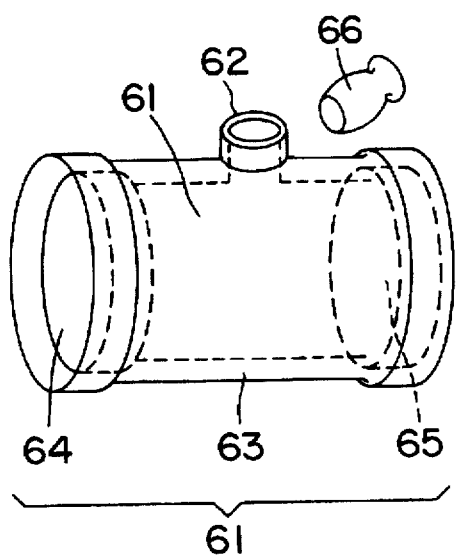
FIG. 1 is a perspective view of a conventional cell for use in an infrared spectroscopy.
Figure 2:
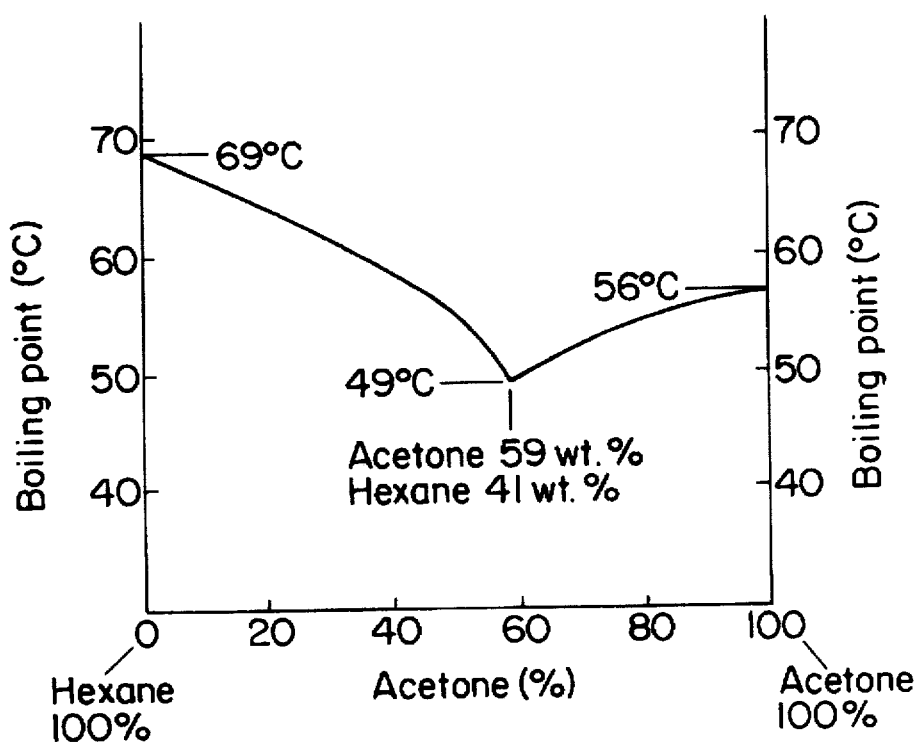
FIG. 2 is a composition diagram of a mixture of acetone and hexane.

The present invention will be explained in detail by making reference to a composition diagram shown in FIG. 2, which shows a relationship between a composition of a mixture of acetone and hexane and a boiling point.

Pure hexane (100%) has a boiling point of 69° C. As a ratio of acetone is increased in a mixed solvent of hexane and acetone, a boiling point of the mixed solvent decreases. When the amounts of hexane and acetone are 41% by weight and 59% by weight, respectively, the boiling point is 49° C. and lowest. As the ratio of acetone is further increased from 59% by weight, the boiling point of the mixed solvent increases. Pure acetone (100%) has a boiling point of 56° C.

In particular, when a mixed solvent of acetone and hexane comprising 56% by weight or larger of acetone, preferably having a composition providing an azeotropic point or a boiling point around the azeotropic point is used, the organic substance to be measured is extracted by removing the mixed solvent at a temperature lower than the boiling point of acetone (56° C.).

The mixed solvent comprising 44 to 34% by weight of hexane and 56 to 66% by weight of acetone can be easily removed by heating the mixed solvent at a temperature of 50° ±1° C. or higher. When the mixed solvent having such composition is used, an organic substance having a boiling point slightly higher than the boiling point of the mixed solvent is easily extracted.

According to the present invention, an organic substance which is dissolved in either one of the polar solvent and the nonpolar solvent can be extracted. Therefore, a wide variety of organic substances can be extracted by the method of the present invention.

Figure 3:
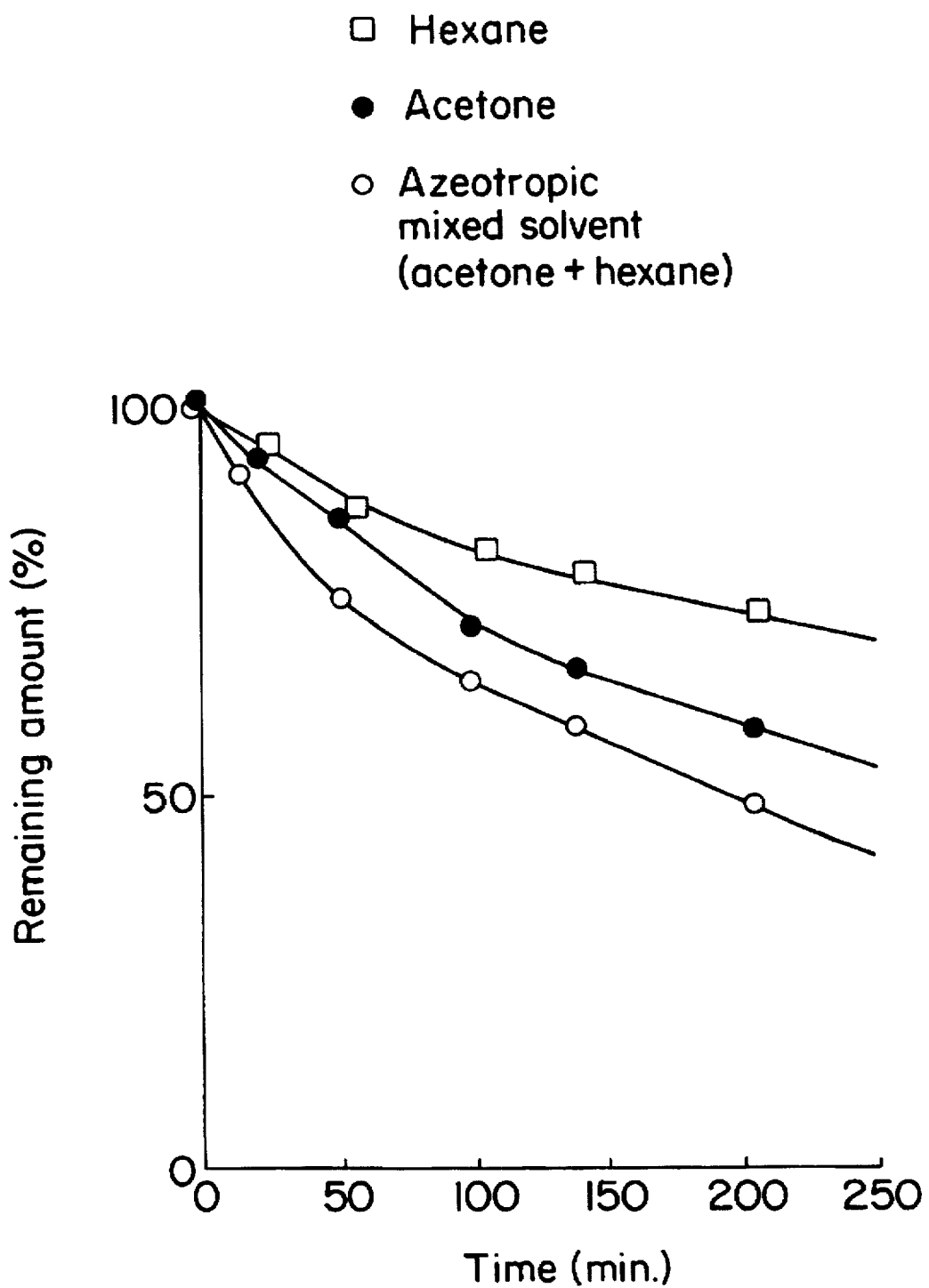
FIG. 3 is a graph showing how hexane, acetone and a mixed solvent of acetone and hexane are evaporated and decreased when they are kept at 20° C., FIG. 4 schematically shows an apparatus for extracting an organic substance with a mixed solvent according to the present invention.

FIG. 3 shows how pure hexane, pure acetone and the mixed solvent of acetone and hexane are extracted and decreased when they are kept at 20° C.

As seen from the graph, the mixed solvent is evaporated in a larger amount than pure hexane and pure acetone.

In each of pure acetone, pure hexane and a mixed solvent of acetone and hexane (weight ratio of 59:41), an ethylene-vinyl acetate copolymer (EVA) (molecular weight of 80,000, and a molar ratio of ethylene to vinyl acetate of 67:33), a polyvinyl chloride (PVC) (molecular weight of 60,000) or a polyvinyl formal (PVFM) (molecular weight of 60,000) was dissolved.

The results are shown in Table 1.

TABLE 1

| Solvent | Polymer | | |
| --- | --- | --- | --- |
| | EVA | PVC | PVFM |
| Acetone | Partly soluble to insoluble | Soluble | Partly soluble |
| Hexane | Soluble | Soluble | Partly soluble to insoluble |
| Mixed solvent of acetone and hexane | Soluble | Soluble | Soluble |
| Carbon tetrachloride | Soluble | Soluble | Partly soluble to insoluble |

An alkyl resin can be dissolved in acetone or hexane. However, hexane and acetone have different dissolving powers with different vinyl base resins such as the ethylene-vinyl acetate resin and the polyvinyl formal. That is, in hexane, the ethylene-vinyl acetate copolymer is dissolved, while polyvinyl formal is hardly dissolved. In acetone, the ethylene-vinyl acetate copolymer is hardly dissolved, while polyvinyl formal is dissolved.

In each of pure acetone, pure hexane and a mixed solvent of acetone and hexane (weight ratio of 59:41), a hydrocarbon oil, an ester base oil or a modified silicone oil was dissolved.

The results are shown in Table 2.

TABLE 2

| Solvent | Oil | | |
|---|---|---|---|
| | Hydrocarbon oil | Ester base oil | Silicone oil |
| Acetone | Partly soluble to insoluble | Soluble | Partly soluble |
| Hexane | Soluble | Soluble | Partly soluble |
| Mixed solvent of acetone and hexane | Soluble | Soluble | Soluble |
| Carbon tetrachloride | Soluble | Soluble | Soluble to partly soluble |

The ester base oil is soluble In hexane and acetone, but they have different dissolving powers with the hydrocarbon oil or the silicone oil. Since hexane is a nonpolar solvent, the hydrocarbon oil is dissolved therein but an oil having a polarity or the alcohol-modified silicone oil is hardly dissolved therein.

Since acetone is a polar solvent, only a small amount of the hydrocarbon oil is dissolved therein, while an oil having a polarity or the alcohol-modified silicone oil is dissolved. In addition, an oil having a hydrophilic group which is expected to be used in a larger amount in future can be dissolved in acetone.

The method for extracting and measuring the organic substance will be explained by making reference to FIG. 4 which schematically shows an apparatus for extracting an organic substance from a material.

Figure 4:
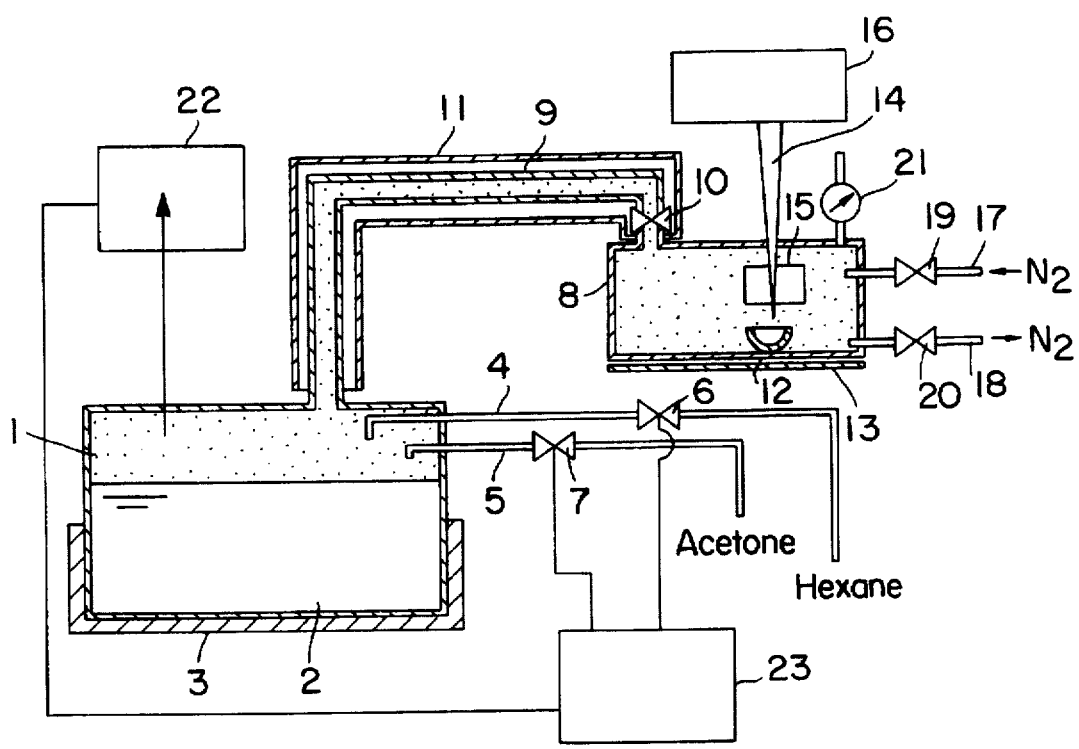

The apparatus of FIG. 4 comprises a constant temperature tank 1 containing a mixed solvent 2 of hexane and acetone, a heater 3 for heating the tank 1 and maintaining the mixed solvent at the lowest azeotropic point or higher to evaporate the mixed solvent. The tank 1 has a hexane-supplying pipe 4 and an acetone-supplying pipe 5, and hexane and acetone are supplied by opening valves 6 and 7, respectively.

The apparatus comprises a sample-treating room 8, which is connected with the tank 1 by a solvent vapor conveying pipe 9 having a valve 10. When the valve 10 is opened, the solvent vapor is introduced in the sample-treating room 8 from the tank 1. The pipe 9 is surrounded by a heating jacket 11 to prevent condensation of the mixed solvent in the pipe.

In the sample-treating room 8, a ceramic vessel 12 is provided for containing an organic substance to be quantitatively analyzed. The ceramic vessel 12 is heated by a heater 13 to heat the vessel 12 at a temperature lower than the boiling point of the organic substance to be analyzed and higher than the boiling point of the mixed solvent.

A sample-holding member 14, which may be made of stainless steel, passes through an upper wall of the vessel 8, and a lower end of the member 14 is positioned above the vessel 12.

At the lower end portion of the member 14, a sample 15 containing the organic substance to be analyzed is attached.

The upper end of the sample-holding member 14 is connected to a cooling apparatus 16 to cool the sample 15 by the cooling apparatus 16 through the member 14, so that the vapor of the mixed solvent is condensed on and/in the sample 15.

The sample-treating room 8 has an inlet pipe 17 and an outlet pipe 18 for introducing nitrogen gas in the room 8 and exhausting the nitrogen gas from the room 8, respectively by opening or closing respective valves 19 and 20.

An internal pressure of the sample-treating room 8 is controlled by a pressure control valve 21.

A composition of the vapor of the mixed solvent is monitored by a gas chromatography 22. According to an output from the gas chromatography 22, a controller 23 equipped with a computer opens or closes the valves 6 and 7 to supply acetone and/or hexane in the tank 2 so as to maintain the composition of the mixed solvent at the azeotropic ratio.

Using the above apparatus, the organic substance, for example, an oil is extracted from the sample.

First, a window (not shown) of the sample-treating room 8 is opened, and the sample 15 is attached to the lower end of the sample-holding member 15. Then, the window is closed, and air in the room 8 is replaced by the nitrogen gas. That is, the valves 19 and 20 are opened to supply the nitrogen gas in the room 8 through the inlet pipe 17 while evacuating the air from the room 8 through the outlet pipe 18.

The mixed solvent of hexane and acetone in the tank 1 is heated by the heater 3 to a temperature higher than the boiling point of the mixed solvent to vaporize it.

After the internal atmosphere of the sample-treating room 8 is replaced by the nitrogen gas, the valve 10 is opened to introduce the vapor of the mixed solvent in the room 8 through the pipe 9 which is heated by the heating jacket 11.

The pressure in the sample-treating room 8 is adjusted to a predetermined value by the pressure control valve 21.

The sample-holding member 14 is cooled by the cooling apparatus 16 and, in turn, the sample attached to the lower end of the sample-holding member 14 is also cooled.

The vapor of the mixed gas introduced in the sample-treating room 8 is contacted to the cooled sample 15 and condensed and liquefied. Then, in the liquefied mixed solvent, the organic substance is dissolved.

The liquefied mixed solvent containing the dissolved organic substance drops in the ceramic vessel 12 which is placed below the sample 15.

Since the ceramic vessel 12 is heated by the heater 13 at a predetermined temperature, the mixed solvent having the lower boiling point is smoothly evaporated, while the organic substance having the higher boiling point than the mixed solvent remains in the vessel 12.

The ceramic vessel 12 is removed from the sample-treating room 8, and then the mixed solvent is evaporated off completely.

Figure 5A:
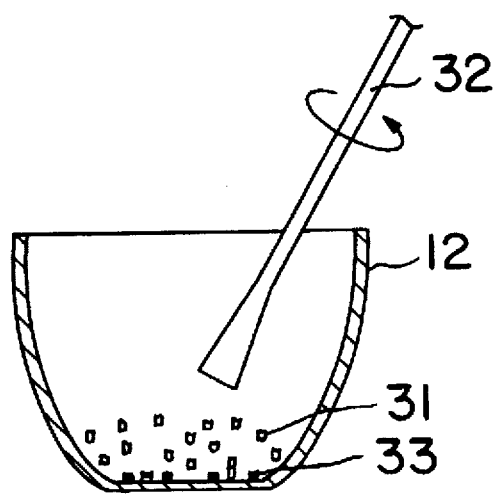
FIGS. 5A and 5B illustrate a manner for mixing the collected organic substance and potassium bromide powder, FIG. 6 schematically shows an apparatus for producing a tablet for use in the infrared spectroscopic analysis, and FIG. 7 schematically shows an apparatus for extracting an organic substance or oil according to the present invention.

Thereafter, potassium bromide powder 31 is charged in the ceramic vessel 21 and mixed with by a spatula 32 with scraping the bottom of the vessel 12 as shown in FIG. 5A.

Figure 5B:
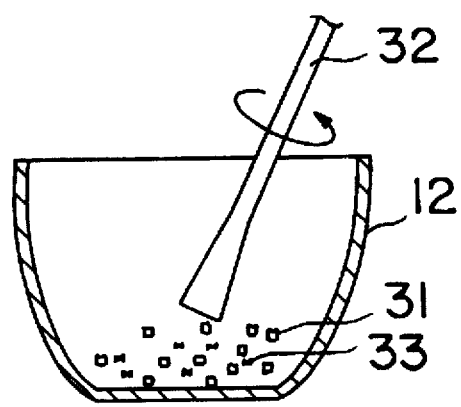

The extracted organic substance 33 which adheres to the inner wall of the vessel 12 is scraped off by a friction force generated by crystals of the potassium bromide powder 31 and dispersed in the potassium bromide powder 31 as shown in FIG. 5B.

Figure 6:
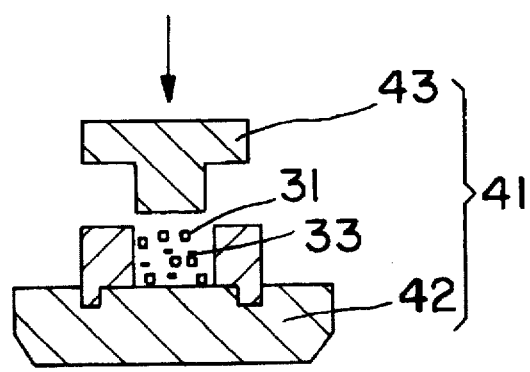

The potassium bromide powder 31 containing the dispersed organic substance 33 is placed in a main body 42 of a press tableting machine 41 shown in FIG. 6 and pressed by a lid 43 to obtain a tablet for use in the infrared spectroscopic analysis.

Using this tablet, an intensity of the specific absorption of the C—H bond around 2920 $cm^{-1}$ is measured by the conventional infrared spectroscopic analysis and the organic substance is analyzed.

If the mixed solvent 2 in the tank 1 is quickly evaporated and no care is taken, the composition of the mixed solvent changes in a relatively short period of time.

In the above embodiment, the composition of the vapor of the mixed solvent in the tank 1 is monitored by the gas chromatography 22, and an equilibrium state of the mixed solvent is checked by the controller 23. When the composition of the mixed solvent vapor deviates from the equilibrium state, opening degrees of the valves 6 and 7 are adjusted by the controller to control the supply amounts of hexane and acetone so that the mixing ratio of hexane and acetone is maintained at the azeotropic ratio.

A next embodiment of the present invention will be explained by making reference to FIG. 7, which schematically shows an apparatus for extracting an organic substance or oil from a sample according to the present invention.

Figure 7:
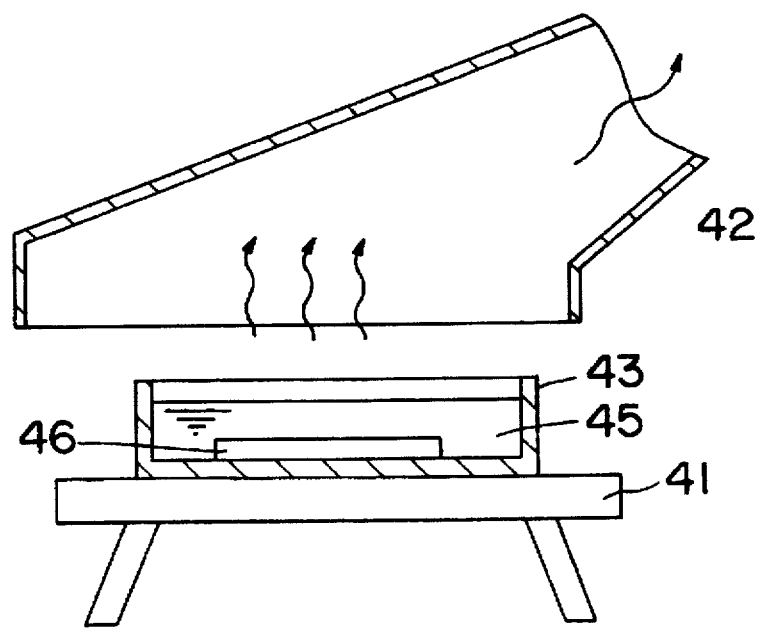

The apparatus of FIG. 7 comprises a heater 41 having a thermostat (not shown), and a local evacuating apparatus 42. On the heater 41, a glass dish 43 for heating a sample is placed, and a mixed solvent 45 is charged in the glass dish 43.

The heater 41 is maintained at a predetermined temperature, for example, by applying an electric current therethrough.

The glass dish 43 is placed on the heater 41, and a piece of a sample 46 having a suitable size is placed in the dish 43. Then, the mixed solvent of, for example, acetone and hexane is poured in the dish 43 in an amount that the sample 46 is immersed in the mixed solvent to extract the organic substance from the sample at a predetermined temperature for a predetermined period of time.

After such extraction period, the sample 46 is removed from the mixed solvent 45, and the dish is further heated. After an amount of the mixed solvent is decreased, the mixed solvent 45 containing the dissolved organic substance is poured in a ceramic vessel and then the solvent is completely evaporated off.

Thereafter, the potassium bromide powder is added and a tablet for use in the infrared spectroscopic analysis is produced in the same manner as in the previous embodiment. Using the tablet, an intensity of the specific absorption of the C—H bond around 2920 cm$^{-1}$ is measured by the infrared spectroscopic analysis and the organic substance is analyzed.

Instead of or in addition to the heating of the mixed solvent, it is possible to extract the organic substance by the application of ultrasonic wave.

A further embodiment of the present invention will be explained.

Tetrahydrofuran (THF) is a solvent having an excellent extraction ability. However, it is easily oxidized, and if it is concentrated in a peroxide state, it tends to explode.

Since a mixture of THF and hexane forms an azeotropic mixture, when an excess amount of hexane is added to THF, THF is azeotropically evaporated, leaving an excess portion of hexane.

Then, acetone is added to remaining hexane in an azeotropic ratio and the mixed solvent having better volatility is evaporated off. Thereby, an organic substance, which is soluble in THF but is hardly extracted, can be easily and safely extracted.

A yet further embodiment of the present invention will be explained.

An organic substance is extracted with a first solvent which is one of the polar solvent and the nonpolar solvent. To the solution, an excess amount of a second solvent which forms an azeotropic mixture with the first solvent and is the other one of the polar solvent is added and the nonpolar solvent. Then, the resulting solution in the mixed solvent is heated to evaporate the mixed solvent in the azeotropic ratio, leaving an excess portion of the second solvent.

To the remaining second solvent containing the dissolved organic substance, an excess amount of a third solvent which forms an azeotropic mixture with the second solvent is added. Again the mixture is heated to evaporate the mixed solvent in the azeotropic ratio, leaving the third solvent.

Since the boiling point of the solvent is stepwise decreased by changing the solvent from first one to second one and then from second one to third one, an organic substance, which can be dissolved in the first solvent but cannot be recovered from the first solvent because of its lower boiling point than the boiling point of the first solvent, can be extracted.

When the above procedure is repeated to decrease a boiling point of a substance, an organic solvent which is hardly extracted by the conventional method can be extracted easily.

What is claimed is:

1. In a method for extracting at least one oil from a material without use of ozone destroying solvents comprising extracting said at least one oil with a solvent, the improvement wherein the solvent is a mixed solvent which comprises at least one polar solvent and at least one nonpolar hydrocarbon solvent, and wherein said mixed solvent has the lowest azeotropic point, and said oil has a boiling point higher than said lowest azeotropic point.

2. The method according to claim 1, wherein said polar solvent is a ketone.

3. The method according to claim 2, wherein said ketone is acetone, and said nonpolar hydrocarbon solvent is hexane.

4. The method according to claim 3, wherein said mixed solvent contains hexane in a ratio showing the lowest azeotropic point or larger.

5. The method according to claim 3, wherein said mixed solvent consists of 56% by weight or larger of acetone and 44% by weight or less of hexane.

6. The method according to claim 5, wherein said mixed solvent consists of 56 to 66% by weight of acetone and 44 to 34% by weight of hexane.

7. A method for extracting at least one oil from a material without use of ozone destroying solvents comprising steps of dissolving said at least one oil in one of a polar solvent and a nonpolar hydrocarbon solvent to form a solution and adding the other one of said polar solvent and said nonpolar hydrocarbon solvent to said solution in an azeotropic ratio.

8. A method for extracting at least one oil from a material without use of ozone destroying solvents comprising steps of:

dissolving said oil in a first solvent which is one of a polar solvent and a nonpolar hydrocarbon solvent to form a solution, adding an excess amount of a second solvent which can form an azeotropic mixture with said first solvent and is the other one of said polar solvent and said nonpolar hydrocarbon solvent to said solution, removing said first solvent, with leaving an excess portion of said second solvent, adding an excess amount of a third solvent which can form an azeotropic mixture with said second solvent to said remaining second solvent, removing said second solvent, leaving an excess portion of said third solvent, and repeating the addition of a subsequent solvent to a previous remaining solvent and removal of the previous solvent to leave the subsequent solvent having a lower boiling point.

9. A method for measuring a content of an oil in a material without use of ozone destroying solvents comprising steps of:

dissolving said oil in a mixed solvent which comprises at least one polar solvent and at least one nonpolar hydrocarbon solvent and has an azeotropic point lower than any boiling points of said polar and nonpolar hydrocarbon solvents, removing said mixed solvent to selectively collect said oil and measuring an intensity of a specific absorption of a C—H bond around 2920 $cm^{-1}$ in an infrared spectroscopy.

10. The method according to claim 9, wherein said mixed solvent comprises at least two solvents having different boiling points.

11. The method according to claim 9, wherein said mixed solvent has the lowest azeotropic point.

12. The method according to claim 11, wherein said lowest azeotropic point of said mixed solvent is lower than a boiling point of said oil.

13. The method according to claim 9, wherein said polar solvent is a ketone.

14. The method according to claim 13, wherein said ketone is acetone, and said nonpolar hydrocarbon solvent is hexane.

15. The method according to claim 14, wherein said mixed solvent contains hexane in a ratio showing the lowest azeotropic point or larger.

16. The method according to claim 14, wherein said mixed solvent consists of 56% by weight or larger of acetone and 44% by weight or less of hexane.

17. The method according to claim 14, wherein said mixed solvent consists of 56 to 66% by weight of acetone and 44 to 34% by weight of hexane.

* * * * *